(12) United States Patent
Fujiwara et al.

(10) Patent No.: US 8,394,530 B2
(45) Date of Patent: Mar. 12, 2013

(54) CARBON MATERIAL AND A PROCESS FOR ITS MANUFACTURE

(75) Inventors: Tooru Fujiwara, Nishinomiya (JP); Hiroshi Yamamoto, Ikeda (JP)

(73) Assignee: Chuo Denki Kogyo Co., Ltd., Niigata (JP)

(*) Notice: Subject to any disclaimer, the term of this patent is extended or adjusted under 35 U.S.C. 154(b) by 756 days.

(21) Appl. No.: 12/458,914

(22) Filed: Jul. 28, 2009

(65) Prior Publication Data

US 2010/0035149 A1 Feb. 11, 2010

Related U.S. Application Data

(63) Continuation of application No. PCT/JP2008/051391, filed on Jan. 30, 2008.

(30) Foreign Application Priority Data

Jan. 31, 2007 (JP) ................................ 2007-021627

(51) Int. Cl.
*H01M 4/02* (2006.01)
*H01M 4/58* (2010.01)
(52) U.S. Cl. ..................................... 429/209; 429/231.8
(58) Field of Classification Search .................. 429/209, 429/231.8
See application file for complete search history.

(56) References Cited

FOREIGN PATENT DOCUMENTS

| EP | 1 681 738 | 7/2006 |
|---|---|---|
| JP | 5-94838 | 4/1993 |
| JP | 5-217604 | 8/1993 |
| JP | 5-307976 | 11/1993 |
| JP | 5-307977 | 11/1993 |
| JP | 10-255851 | 9/1998 |
| JP | 10-321218 | 12/1998 |
| JP | 2003-100292 | 4/2003 |
| JP | 2004-210634 | 7/2004 |
| JP | 2006-044969 | 2/2006 |
| JP | 2006-44969 | 2/2006 |
| WO | 03/064560 | 8/2003 |

*Primary Examiner* — Helen O Conley
(74) *Attorney, Agent, or Firm* — Clark & Brody

(57) ABSTRACT

A carbon material suitable as a negative electrode material for a lithium ion battery which can suppress decomposition of a nonaqueous electrolytic solution, which has excellent compressibility capable of highly dense packing, and which can form an electrode of high capacity without worsening charge and discharge efficiency or cycling performance. Graphite powder A having an average particle diameter of 10-30 μm and a specific surface area S1 of at most 12.5 m$^2$/g and pitch powder B having a softening point of 80-180° C. and an average particle diameter of 15-150 μm are mixed in proportions such that the mass ratio A/B is 98/2-95.5/4.5, and the resulting mixed powder is subjected to heat treatment in a stationary condition in an inert atmosphere at 900-1100° C. to carbonize the pitch and thereby manufacture a carbon material having carbon adhered to the surface of the above-described graphite powder. Carbon preferentially adheres to the edge planes of the graphite particles. The carbon material has a specific surface area S2 of 1.0-5.0 m$^2$/g, and it satisfies $0.4 \leq S2/S1 \leq 0.8$.

7 Claims, 1 Drawing Sheet

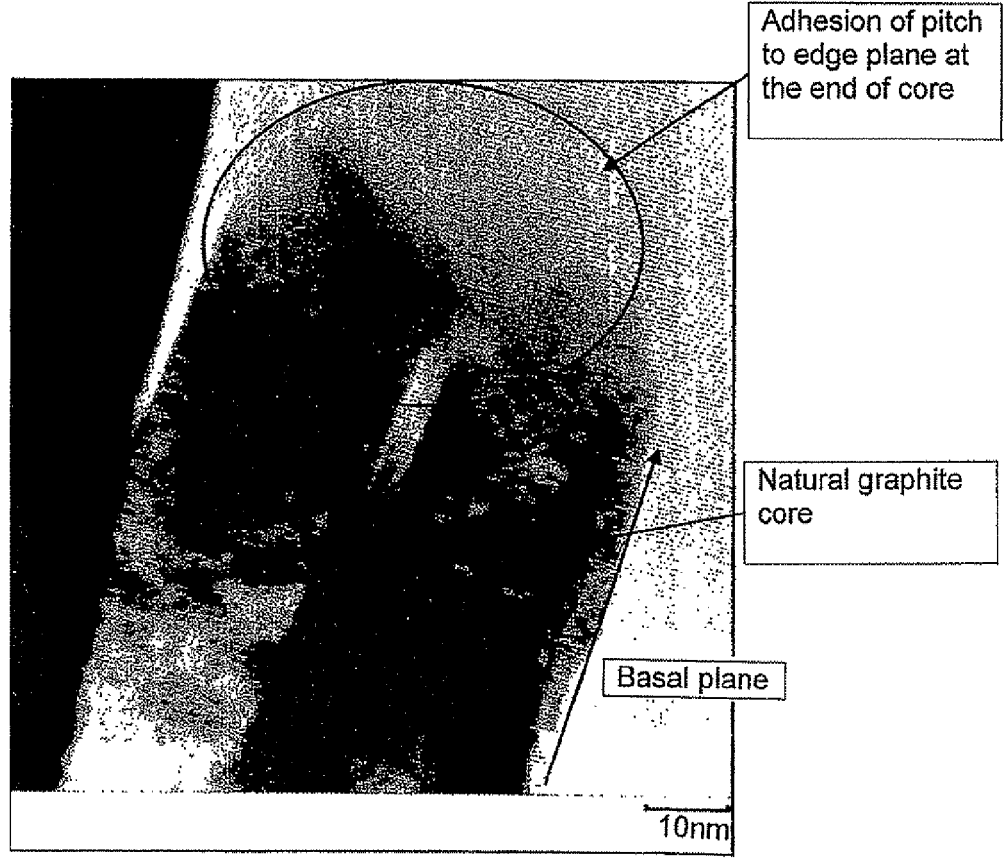

CARBON MATERIAL AND A PROCESS FOR ITS MANUFACTURE

This application is a continuation of International Patent Application No. PCT/JP2008/051391, filed Jan. 30, 2008. This PCT application was not in English as published under PCT Article 21(2).

TECHNICAL FIELD

This invention relates to a carbon material suitable for a negative electrode of a nonaqueous secondary battery such as a lithium ion (secondary) battery and to a process for its manufacture.

BACKGROUND ART

Carbon materials which constitute negative electrodes of lithium ion secondary batteries have primarily been graphite materials and particularly artificial graphite powder.

There has been much research concerning how to increase the capacity per unit mass of graphite materials used for negative electrodes in order to increase the capacity of lithium ion batteries. As a result of such efforts, a graphite material has been developed which gives a capacity exceeding 360 mAh/g, which is close to the theoretical capacity of 372 mAh/g of graphite. Accordingly, increases in the capacity of graphite materials themselves have nearly reached a limit.

Under such circumstances, an attempt was recently made to increase the capacity of a negative electrode by more greatly compressing a negative electrode material and increasing the packing density of the negative electrode as a measure to increase the capacity of lithium ion batteries. In order to compress and densely pack a negative electrode material, it is necessary for particles of the negative electrode material to deform so as to fill empty spaces. Softer particles are more suitable for this purpose. If the particles are hard, it is necessary to apply an excessive load for compression, resulting in equipment problems.

In a lithium ion battery having a negative electrode constituted by a graphite material and particularly natural graphite powder which has a high crystallinity, decomposition of a nonaqueous electrolytic solution of the battery (and more particularly decomposition of an organic carbonate typically used as a solvent) readily occurs. This decomposition causes the irreversible capacity of the battery to increase, and the charge and discharge efficiency (the ratio of the discharge capacity to the charging capacity) and the cycling performance of the battery deteriorate. As a means of suppressing decomposition of an electrolytic solution, there have been many proposals of a carbon material in which a core made of a powder of a graphite material of high crystallinity has its surface coated with a carbonaceous material (see, for example, below-described Patent Documents 1-7). Inexpensive pitch is often used as a coating material. After the surface of the powder of a graphite material constituting cores is coated with pitch, the mixture of the graphite material powder and the pitch is subjected to heat treatment to carbonize the pitch, whereby the coating material becomes a carbonaceous material. In this manner, a carbon material having cores formed from a powder of a graphite material which are coated with a carbonaceous material is obtained.

The object of surface coating of a graphite material with a carbonaceous material which has been proposed in the past is to suppress a reaction between the graphite material and an electrolytic solution, thereby achieving an improvement in charge and discharge efficiency and cycling performance.

Since reaction with an electrolytic solution takes place on the surface of the particles of the graphite material constituting cores, the entire surface of the core particles is coated with the carbonaceous material so that the surfaces of the cores are not exposed. A large amount of a coating material such as pitch is often used in order to coat the entire surface of the core particles. For example, in Patent Document 1, powder of a graphite material which constitutes cores and pitch are mixed in a mass ratio of the graphite material to pitch of 5/95-50/50, and then the mixture undergoes heat treatment. Accordingly, the proportion of pitch is 5-50 mass %.

Patent Documents 2-7 disclose a negative electrode material for a secondary battery having a multiphase structure which is formed from a core of a carbonaceous material having its surface coated with a surface layer of a carbonaceous material and which has a specific Raman spectrum and sometimes specific crystallographic or other properties. The microstructure of the carbonaceous material which forms the surface layer contributes to the Raman spectrum.

The methods disclosed in Patent Documents 2-7 for coating the surface of cores formed from a carbonaceous material are (1) coating by vapor phase thermal decomposition of an organic compound, (2) a method in which an organic compound in liquid phase is carbonized for coating (specifically, as employed in the examples, a fused polycyclic hydrocarbon material such as pitch is dissolved in an organic solvent to make liquid, and cores are immersed in the resulting solution (liquid phase) and then heat-treated to carbonize the pitch), and (3) a method in which cores are coated with an organic polymer such as a resin, and the coating material is subjected to thermal decomposition in solid phase. Any of these methods are intended to uniformly coat the entire surface of particles of the carbonaceous material constituting the cores.

The proportion of the surface layer in each of the carbon materials having a multiphase structure described in Patent Documents 2-7 is preferably 1-80 mass %, more preferably 5-70 mass %, and still more preferably 10-60 mass % in Patent Document 2; it is preferably 2-80 mass %, more preferably 5-65 mass still more preferably 5-50 mass %, and particularly preferably 6-40 mass % in Patent Documents 3 and 4; it is preferably 1-80 mass %, more preferably 5-60 mass %, and still more preferably 7-50 mass % in Patent Document 5; it is preferably 30-70 mass %, more preferably 35-75 mass %, and still more preferably 40-70 mass % in Patent Document 6; and it is preferably 10-65 mass %, more preferably 15-60 mass %, and still more preferably 20-55 mass % in Patent Document 7. However, the proportion constituted by the surface layer in the examples is 50 mass % in Patent Documents 2 and 6, 35 mass % in Patent Documents 3-5, and 45 mass % in Patent Document 7. There is no specific example of a multiphase structure in which the proportion constituted by the surface layer is smaller than 35 mass %. The reason why the proportion constituted by the surface layer is given a large value in this manner is thought to be in order to impart a desired Raman structure by the microstructure of the surface layer.

Patent Document 1: JP 2003-100292 A1
Patent Document 2: JP H10-321218 A1
Patent Document 3: JP H10-255851 A1
Patent Document 4: JP H05-94838 A1
Patent Document 5: JP H05-217604 A1
Patent Document 6: JP H05-307976 A1
Patent Document 7: JP H05-307977 A1

DISCLOSURE OF INVENTION

In our research, we found that when a core is made of graphite powder and its surface is coated with a carbonaceous material in an amount such that physical properties such as a specific Raman spectrum appears, the amount of surface coating by the carbonaceous material becomes excessive, and the particle strength of a negative electrode material becomes too high. As a result, the negative electrode material cannot be adequately compressed and the electrode density does not increase. If the material is excessively compressed so as to obtain a high electrode density, the surface coating is excessively crushed, and an even larger decrease in the charge and discharge efficiency and an even greater worsening of cycling performance occurs.

The object of the present invention is to provide a carbon material suitable for a negative electrode material of a non-aqueous secondary battery, the carbon material suppressing decomposition of a nonaqueous electrolytic solution and at the same time having excellent compressibility so that it can be packed to a higher density inside an electrode and, as a result, can achieve an increase in electrode density and accordingly a higher electrode capacity without a worsening of charge and discharge efficiency or cycling performance.

Whether it is natural graphite powder or artificial graphite powder, graphite powder has a hexagonal layered crystal structure and is in the form of pulverized powder. Pulverization of graphite occurs due to both cleavage by delamination (interlaminar splitting of the layered crystal structure) and fracture in a direction at an angle (typically in a generally perpendicular direction) with respect to the cleavage plane. Accordingly, the surface of a particle of graphite powder includes a basal plane (a plane parallel to the cleavage plane) and an edge plane (a plane at an angle to the cleavage plane and typically a plane which is generally perpendicular to the cleavage plane). On a basal plane, the outermost layer of a hexagonal layered crystal structure is exposed, whereas on an edge plane, the end edge of each layer which constitutes the layered crystal structure (the end portion which is cut off within each layer due to pulverization) is exposed.

While a basal plane has a smooth surface, an edge plane has large irregularities, and active groups having reactivity are exposed on the edge plane. Therefore, an edge plane exhibits much higher activity than a basal plane. Accordingly, the primary cause of a decrease in charge and discharge efficiency due to decomposition of an electrolytic solution is thought to be decomposition of the solution which occurs at the surface and particularly on the edge planes of graphite particles.

Therefore, it is sufficient for pitch, which is used to coat the surface of graphite powder core with a carbonaceous material, to preferentially adhere to the edge planes of the particles of graphite powder such that the edge planes are protected by a carbonaceous material formed from pitch. As stated above, if graphite powder is coated with a large amount of pitch so as to coat the entire surface of graphite particles, the strength of the particles becomes too high and their compressibility worsens, and battery performance such as charge and discharge efficiency and cycling performance ends up worsening.

Edge planes have highly active, reactive groups exposed thereon and are rougher (having larger irregularities) than basal planes. As a result, when graphite powder is mixed with pitch and heated to melt the pitch, the edge planes of the graphite particles are preferentially wet by molten pitch. Accordingly, if the amount of pitch is suppressed to an amount smaller than the amount necessary to coat the entire surface of graphite powder, it is possible to preferentially coat the edge planes of graphite particles with pitch.

As a result of further study, it was found that by adjusting the specific surface area and the average particle diameter of graphite powder used as cores, the softening point and the average particle diameter of pitch used for surface coating, the proportions of these materials, and treatment conditions, it is possible to manufacture a carbon material which has good compressibility which makes it possible to achieve a high degree of packing in order to increase capacity and which does not cause a decrease in charge and discharge efficiency and cycling performance.

According to one aspect, the present invention is a process for manufacturing a carbon material which comprises the following steps:

mixing a graphite powder A having an average particle diameter of 10-30 µm and a specific surface area S1 of at most 12.5 m$^2$/g and pitch powder B having a softening point of 80-180° C. and an average particle diameter of 15-150 µm in proportions such that the mass ratio A/B is in the range of 98/2-95.5/4.5 (mixing step), and subjecting the mixed powder obtained in the mixing step to heat treatment with the powder being kept in a stationary state in an inert atmosphere at 900-1100° C. (heat treatment step).

During the heat treatment step, the pitch is melted, the molten pitch adheres to the graphite powder, and then it is carbonized and becomes carbon. Carbon which is formed by heat treatment in the above temperature range is carbon of low crystallinity having a turbostratic crystallographic structure and is referred to as low temperature calcined carbon (or turbostratic carbon). If this heat treatment step is not carried out in a stationary state but is carried out with mixed powder which is kept in an agitated or fluidized state, the pitch readily adheres to the entire surface of particles of the graphite powder, and it becomes difficult to preferentially coat the edge planes of the graphite particles. As a result, the amount of coated pitch required for prevention of decomposition of an electrolytic solution increases, and compressibility of the coated graphite powder and accordingly battery properties worsen.

In a process according to the present invention, the amount of pitch which is used for coating is very limited, and it preferentially adheres to the edge planes, which have large irregularities. During heat treatment, the pitch melts and is carbonized. Therefore, the average particle diameter of the resulting carbon material is substantially the same as the average particle diameter of the graphite powder used as cores.

A carbon material manufactured by a process according to the present invention can be characterized not only by its average particle diameter but also by the specific surface area of the graphite powder which constitutes cores and the specific surface area thereof after being coated with carbon formed by carbonization of pitch. A carbon material which is thus identified is itself novel.

Accordingly, from another aspect, the present invention is a carbon material comprising cores of graphite powder having a specific surface area S1 of at most 12.5 m$^2$/g, and carbon adhering to the surface of the cores, wherein the carbon material has a specific surface area S2 of 1.0-5.0 m$^2$/g with satisfying $0.4 \leq S2/S1 \leq 0.8$, and its average particle diameter is 10-30 µm.

In this carbon material, carbon preferentially adheres for coating to the edge planes of the particles of graphite powder which form cores. It can be ascertained that carbon preferentially adheres to and coats the edge planes using, for example, a transmission electron microscope (TEM).

The average particle diameter used in this context means the particle diameter D50 at 50% volume fraction in a cumulative particle diameter distribution. The specific surface area is a value measured by the BET method using nitrogen gas adsorption in a conventional manner. The specific surface area S1 of cores is a value obtained by measurement before adhesion or deposition of carbon thereon.

A carbon material according to the present invention is suitable as a negative electrode material for a nonaqueous secondary battery such as a lithium ion battery. It is particularly suitable for use as a negative electrode material for a nonaqueous secondary battery in which the nonaqueous electrolytic solution used in the battery contains substantially no PC (propylene carbonate), which can be used as a solvent in nonaqueous batteries.

Accordingly, from another aspect, the present invention is a negative electrode for a nonaqueous secondary battery fabricated using the above-described carbon material and a nonaqueous secondary battery comprising this negative electrode and a nonaqueous electrolytic solution containing substantially no PC.

Here, "containing substantially no PC" means that the content of PC (propylene carbonate) in the nonaqueous electrolytic solution is at most 5 mass %. The content of PC is preferably at most 1 mass % and more preferably 0 mass %.

Compared to an electrolytic solution containing substantially no PC, an electrolytic solution containing PC undergoes a more violent reaction and forms a solvate by reacting the PC-containing electrolytic solution with lithium ions. The resulting solvate has a molecular size which is larger than the layer distance or spacing of the layered graphite crystals. It is thought if such large molecules penetrate through the edge planes of the graphite crystals into the spacing between the layers of the crystals, they can easily cause breakdown of graphite particles. In order to prevent such a reaction, it is generally necessary to substantially entirely coat the edge planes of the graphite particles. In order to coat the entirety of the edge planes with certainty, a large amount of pitch has to be employed. As described above, however, the problems develop that the particle strength of a carbon material after coating becomes too high, the electrode density cannot be increased, and if the pressing force at the time of electrode fabrication is made too high, a deterioration in cycling performance occurs.

According to the present invention, graphite powder particles constituting cores are mixed with a limited amount of pitch powder. Heat treatment is then carried out in a stationary state to carbonize the pitch, whereby a carbon material is obtained having at least a portion of the edge planes of the graphite particles preferentially coated with carbon. When this carbon material is used as a negative electrode material of a nonaqueous secondary battery, decomposition of an electrolytic solution is markedly suppressed, and the charge and discharge efficiency and cycle life are markedly improved. In addition, since the negative electrode material is not excessively strengthened, it becomes possible to achieve an increase in the density and accordingly an increase in the capacity of a negative electrode.

BRIEF EXPLANATION OF THE DRAWINGS

FIG. 1 is a TEM image of a carbon material according to the present invention. It shows that low temperature calcined carbon derived from pitch (indicated as pitch in the FIGURE) preferentially adheres to the edge planes of graphite particles constituting cores, and that adhesion of pitch to the basal planes does not take place.

BEST MODE FOR CARRYING OUT THE INVENTION

A carbon material according to the present invention comprises cores of graphite powder having carbon adhering to the surfaces of particles of the graphite powder. The carbon material has the following characteristics:

the specific surface area S1 of the graphite powder constituting cores before adhering carbon thereto is at most 12.5 $m^2/g$, and the carbon material having carbon adhered to the graphite powder cores has a specific surface area S2 which is in the range of 1.0-5.0 $m^2/g$ and which satisfies $0.4 \leq S2/S1 \leq 0.8$, and its average particle diameter is 10-30 μm.

Adhesion of carbon to the graphite powder cores preferentially takes place on the edge planes of the surfaces of graphite powder particles. Preferential adhesion of carbon to the edge planes can be achieved by limiting the amount of pitch (which is the precursor of carbon) to be mixed with the cores to a small amount and performing heat treatment of a mixture of the pitch and graphite powder in a stationary state.

As described above, the average particle diameter of a carbon material obtained by adhering a small amount of carbon to graphite powder cores is substantially the same as the average particle diameter of the graphite powder cores. Accordingly, the graphite powder which are used as cores have an average particle diameter in the range of 10-30 μm.

If the average particle diameter of a carbon material is too small, agglomeration easily takes place at the time of handling of the graphite powder or the carbon material, and this makes handling difficult. For example, formation of a slurry of the carbon material for use in application at the time of electrode fabrication becomes difficult. If the average particle diameter of the carbon material is too large, irregularities in the electrode surface become too large, and this may cause short circuits to develop in a battery. A preferred average particle diameter for the graphite powder and the carbon material is 12-25 μm.

The specific surface area S1 of the graphite powder used as cores is at most 12.5 $m^2/g$. If the specific surface area of the graphite powder is too large, the amount of pitch necessary to coat the surface sufficiently becomes large. The specific surface area S1 is more preferably at most 10 $m^2/g$. The specific surface area of graphite powder depends upon the average particle diameter as well as the pore structure of the graphite powder. Almost all of the pores open onto the edge planes, so the specific surface area of graphite powder cores prior to coating is considerably large.

Graphite powder used as cores can be powder of either natural graphite or artificial graphite. A mixture of the two types can also be used. Natural graphite is cheaper than artificial graphite, but its degree of graphitization is extremely high, so the reactivity of its edge planes is high. Therefore, natural graphite offers problems in that it causes the irreversible capacity of an electrode due to decomposition of an electrolytic solution to increase and deteriorates battery properties such as storage stability and safety. Therefore, natural graphite has been little used as a negative electrode material for a lithium ion battery. However, in the present invention, edge planes having high reactivity are preferentially coated whereby decomposition of an electrolytic solution is suppressed. Therefore, natural graphite powder can also be used satisfactorily as long as it has an average particle diameter and specific surface area within the above-described ranges. The use of natural graphite makes it possible to decrease the manufacturing costs of an electrode. An example of natural graphite powder having a specific surface area of at most 12.5 $m^2/g$ is natural graphite powder which has been spheroidized by pulverization.

The specific surface area S2 of a carbon material which is graphite powder used as cores having carbon deposited thereon is in the range of 1.0-5.0 $m^2/g$ and satisfies $0.4 \leq S2/$ $S1 \leq 0.8$. In the present invention, carbon preferentially adheres to the edge planes of graphite powder particles. As a result of the edge planes being coated with carbon, pores which open onto the edge planes are sealed off. Accordingly, the specific surface area S2 of a carbon material after carbon preferentially adheres to the edge planes of graphite powder particles is decreased compared to the specific surface area S1 of uncoated cores formed from graphite powder. Namely, the ratio S2/S1 is typically smaller than 1. The ratio S2/S1 depends upon the proportion of pitch relative to graphite powder cores. The larger the proportion of pitch, the smaller the ratio becomes.

If the ratio S2/S1 is smaller than 0.4, the amount of surface coating of cores by carbon becomes too large, particles become hard, and the electrode density cannot be increased. In addition, if the amount of surface coating is too large, the charge and discharge efficiency and the cycling performance of a battery worsen. If S2/S1 is larger than 0.8, the surface coating of edge planes of the particles of graphite powder cores is insufficient to suppress decomposition of the electrolytic solution, and the charge and discharge efficiency and cycling performance of a battery worsen. The ratio S2/S1 is preferably 0.5-0.7.

As described above, deposition of carbon on the surface of graphite powder results in a decrease in specific surface area. If the absolute value of the specific surface area S2 of the resulting carbon material becomes larger than 5.0 m$^2$/g, it becomes difficult to prepare a slurry of the carbon material and apply it at the time of electrode fabrication. In addition, the carbon material has an increased reactivity, thereby deteriorating the safety of a battery. On the other hand, if S2 is smaller than 1.0 m$^2$/g, battery performance during high speed charging or high rate discharge may worsen. A preferred range for S2 is 1.0-4.0 m$^2$/g.

Next, a process of manufacturing a carbon material according to the present invention will be explained. This manufacturing process comprises the following two steps:

mixing the above-described graphite powder A used as cores and pitch powder B having a softening point of 80-180° C. and an average particle diameter of 15-150 μm in such a proportion that the mass ratio A/B is 98/2-95.5/4.5 (referred to below as a mixing step), and subjecting the mixed powder obtained in the mixing step to heat treatment in a stationary state in an inert atmosphere at 900-1100° C. (referred to below as a heat treatment step).

For the above-described reasons, the graphite powder used in the mixing step has an average particle diameter of 10-30 μm and a specific surface area S1 of at most 12.5 m$^2$/g. From the standpoint of cost, natural graphite powder which is spheroidized by pulverizing is preferred.

Pitch powder which is mixed with the graphite powder has a softening point of 80-180° C. and an average particle diameter of 15-150 μm. Pitch powder can be either petroleum-derived or coal-derived, and a mixture of the two can also be used.

If the softening point of the pitch is lower than 80° C., the pitch readily melts due to the heat at the time of pulverizing for obtaining pitch powder of a desired particle size making it difficult to control the particle size, and storage of the pitch powder after pulverizing becomes difficult. If the softening point of the pitch is higher than 180° C., the pitch which melts during the heat treatment step carried out in a stationary state does not adequately spread. As a result, adhesion of molten pitch to the surface of graphite powder particles occurs only in the immediate vicinity thereof, and molten pitch does not sufficiently spread by flowing to neighboring graphite particles, whereby the proportion of the graphite powder particles to which molten pitch does not adhere is increased. The softening point of the pitch is preferably in the range of 80-150° C.

If the pitch powder is fine powder with an average particle diameter of less than 15 μm, the powder readily agglomerates and forms clumps which worsen dispersibility. If the average particle diameter of the pitch powder is larger than 150 μm, the number of pitch powder particles with respect to the number of graphite powder particles forming cores becomes small, and during the heat treatment step, molten pitch does not adequately spread to graphite powder particles which are remote from the pitch powder.

The mixing ratio of the graphite powder A and the pitch powder B is such that the mass ratio A/B is 98/2-95.5/4.5. Namely, the proportion of pitch powder in the mixed powder is 2-4.5 mass %. If the proportion of pitch powder is smaller than 2 mass %, the amount of adhered pitch is too small, and carbon derived from pitch does not adhere to the edge planes of graphite particles in an amount sufficient to be effective. On the other hand, if the proportion of pitch powder in the mixture is larger than 4.5 mass %, the amount of adhered pitch is too large. As a result, the particle strength of the obtained carbon material becomes too high to achieve a high packing density of the carbon material, and a high battery capacity cannot be realized. In addition, a decrease in charge and discharge efficiency, which is thought to be caused by collapse of the carbon derived from pitch during compression at the time of electrode manufacture, is observed.

Mixing of graphite powder and pitch powder in a solid state can be carried out using a suitable dry mixing apparatus (a blender, a mixer, or the like). There are no particular limitations on the conditions of solid state mixing as long as graphite powder and pitch powder can be uniformly mixed.

The resulting mixed powder undergoes heat treatment in a stationary state in an inert atmosphere at a temperature of 900-1100° C. During heat treatment, the pitch melts and becomes liquid, and the edge planes of the graphite powder particles which have a higher activity and greater surface irregularities than the basal planes are preferentially wet by molten pitch. As heat treatment continues, the molten pitch is thermally decomposed and carbonized to form low temperature calcined carbon having a turbostratic structure (also referred to as turbostratic carbon), resulting in the formation of a carbon material according to the present invention comprising cores of graphite power having carbon which preferentially adheres to the edge planes of the graphite powder.

If this heat treatment is carried out in a flowing state instead of a stationary state (such as by using a rotary kiln), as described above, it is difficult for molten pitch to preferentially adhere to edge planes. If heat treatment is carried out in an oxidizing atmosphere, both pitch and graphite particles oxidize in the vicinity of 400° C. and above and are dissipated by combustion. The gas of the inert atmosphere may be nitrogen or a noble gas such as argon, or it may be a mixture of both.

If the heat treatment temperature is lower than 900° C., carbonization of pitch does not adequately proceed, and the resulting carbon material has a decreased charge and discharge efficiency. If the heat treatment temperature exceeds 1100° C., expensive equipment is required and it becomes difficult to perform manufacture inexpensively. A preferred heat treatment temperature is in the range of 950-1050° C. The duration of heat treatment can be selected such that the pitch is adequately carbonized, and it varies with the heat treatment temperature but is normally at least 30 minutes.

After cooling of the heat-treated material, the resulting carbon material is recovered. In some cases, graphite powder particles may stick to each other by molten pitch during heat treatment. However, since the bonding force between the particles is weak, the particles can be easily separated by light disintegration, leading to the formation of a carbon material having an average particle diameter which is substantially the same as the average particle diameter of the graphite powder cores (with a variation of at most ±5%).

Manufacture of a negative electrode for a nonaqueous secondary battery using a carbon material according to the present invention as a negative electrode material and assembly of a secondary battery can be carried out in a conventional manner. Below, these procedures will be briefly explained, but this explanation is a mere example, and other methods and structures are possible.

A carbon material for a negative electrode material is mixed with a suitable binder and a solvent therefor to obtain a slurry for application. If necessary, an appropriate electrically conductive additive may be added in order to increase electrical conductivity. Mixing can be carried out using a homogenizer or glass beads as required. The resulting slurry is applied to an appropriate current collector (such as rolled copper foil, electrodeposited copper foil, or the like) by the doctor blade method or similar method. The applied layer is then dried and compressed by rolling with rolls or the like for compaction to obtain an electrode for a negative electrode. It is formed into a prescribed electrode shape by punching either before or after compression.

The particle strength of a carbon material according to the present invention is not excessively high. Therefore, the carbon material has excellent compressibility, and a high capacity electrode in which the carbon material is densely packed can be easily produced by compaction with a moderate compression pressure. Since there is no need to apply a high pressure, the low temperature calcined carbon adhered to the graphite is not collapsed, making it possible to achieve a good charge and discharge efficiency and cycling performance.

A binder which can be used may be one or more selected from a fluoropolymer such as polyvinylidene fluoride or polytetrafluoroethylene, a resinous polymer such as carboxymethylcellulose (CMC), an elastomeric polymer such as styrene-butadiene rubber (SBR), and the like. A solvent for the binder may be N-methylpyrrolidone, water, or the like. For an electrically conductive additive, a carbon material and a metal (such as Ni) can be used. The carbon material for use as an electrically conductive additive includes artificial graphite, natural graphite, carbon black, acetylene black, and the like, and it may be in the form of a powder or fibers.

The basic structure of a nonaqueous secondary battery comprises a negative electrode, a positive electrode, a separator, and a nonaqueous electrolytic solution. There are no particular restrictions on the structure of the positive electrode or the separator. The nonaqueous electrolytic solution is a solution of a supporting electrolyte dissolved in a nonaqueous solvent. A typical nonaqueous solvent used in a nonaqueous secondary battery is an alkylene carbonate. As stated above, in the present invention, a nonaqueous electrolytic solution preferably contains substantially no propylene carbonate (PC). Accordingly, it is preferable to use one or more alkylene carbonates other than PC such as ethylene carbonate (EC) or ethylmethyl carbonate (EMC) as a solvent for a nonaqueous electrolytic solution. There are no particular restrictions on the shape of the battery, and it may be cylindrical, rectangular, coin-shaped, sheet-shaped, or the like.

EXAMPLES

In the following examples and comparative examples, unless otherwise specified, parts refers to parts by mass. In the examples and comparative examples, the average particle diameter is the particle diameter at 50% volume fraction measured by a laser diffraction/scattering particle size distribution analyzer manufactured by Horiba Industries. Specific surface area is a value measured by the BET method by nitrogen gas adsorption using a Quantasorb manufactured by Yuasa-Ionics Inc.

Example 1

95.5 parts of natural graphite powder which had undergone spheroidizing treatment and which had an average particle diameter of 19 µm and a specific surface area (S1) of 5.5 m$^2$/g and 4.5 parts of coal-derived pitch powder having an average particle diameter of 50 µm and a softening point of 85° C. were mixed in solid state using a V blender.

The resulting mixed powder was placed into a heating furnace, in which the powder is subjected to heat treatment in a nitrogen atmosphere at 1000° C. for 1 hour and then allowed to cool to obtain a carbon material in which low temperature calcined carbon formed by carbonization of pitch adhered to the surface of graphite powder. Sticking of the graphite powder particles to each other did not take place. The average particle diameter and the specific surface area (S2) of the resulting carbon material were measured.

Examples 2-13 and Comparative Examples 1-6

Except for the following aspects, a carbon material was prepared in the same manner as in Example 1, and the average particle diameter and specific surface area of the resulting carbon material were measured.

Example 2 and Comparative Example 5: Pitch having a different softening point was used.

Examples 3-5 and 12 and Comparative Examples 1 and 4: Pitch having a different average particle diameter was used.

Examples 6, 7, and 13 and Comparative Examples 2 and 3: The mixing ratio of graphite powder and pitch was varied.

Examples 8 and 9: The heat treatment temperature was varied.

Examples 10, 11, and 13: The average particle diameter of the graphite powder cores was varied.

Comparative Example 6: Heat treatment was carried out in a flowing state using a rotary kiln instead of in a stationary state.

The average particle diameters of the graphite powder and the pitch powder used in the examples and the comparative examples, the specific surface area S1 of the graphite powder, the amount of pitch powder, the heat treatment temperature, the state at the time of heat treatment, the average particle diameter and the specific surface area S2 of the carbon material which was formed, and the ratio S2/S1 are shown in Table 1.

The state of deposition of carbon in the carbon material obtained in the above examples and comparative examples was investigated by TEM. For the carbon material obtained in Examples 1-13, on the locations on the surface of the cores constituted by graphite powder particles where the edge planes and basal planes could be clearly distinguished, it was ascertained that carbon having a turbostratic structure (low temperature calcined carbon derived from pitch which had a low crystalline structure and which appears as pale shadows in a TEM photograph) was preferentially adhered only to the edge planes. One example of such a TEM photograph is shown in FIG. 1.

On the other hand, particularly with the carbon materials of Comparative Examples 2 and 6, it was not possible to observe a structure in which carbon having a turbostratic structure was preferentially adhered only to the edge planes. With the carbon material of the other comparative examples, adhesion of carbon having a turbostratic structure to the edge planes was inadequate.

The electrode properties of the materials obtained in the above examples and comparative examples were tested in the following manner.

To a mixture of the carbon material with CMC (sodium carboxymethyl cellulose) powder, a liquid which contained SBR (styrene-butadiene rubber) dispersed in water was added and stirred to obtain a slurry. The CMC and SBR were used as binders. The mixing ratio of carbon:CMC:SBR was 97:1:2 (mass ratio). This slurry was used to coat a copper foil with a thickness of 17 μm by the doctor blade method (coating weight of 10-11 mg/cm$^2$). After the coated layer was dried, it was punched to form disks with a diameter of 13 mm. Various pressures were applied to the punched disks using a press to obtain electrodes.

The electrode density of the resulting electrodes was determined by measuring the thickness with a micrometer and the mass of an electrode which was compressed with a pressure of 150 MPa (the thickness and mass of copper foil of the same diameter was previously measured, and by subtracting these values, the electrode density of the negative electrode material excluding the copper foil of the electrode was calculated).

The following battery properties were evaluated using an electrode having an electrode density of 1.75 g/cm$^3$. The results of tests of battery properties are also shown in Table 1.

A coin-shaped nonaqueous test cell was prepared by disposing the above-described electrode to be tested and a counter electrode which was a Li metal foil on opposite sides of a polyolefin separator and using an electrolytic solution which was a nonaqueous solution of LiPF$_6$ as a supporting electrolyte dissolved to a concentration of 1M in a mixed solvent of ethylene carbonate (EC) and ethylmethyl carbonate (EMC) at a ratio of EC:EMC=1:3 (volume ratio).

This test cell was subjected to constant current doping at an electric current of 25 mA/g until the potential difference with respect to the counter electrode became 0 V (intercalation of lithium ions into the test electrode, corresponding to charging of a lithium secondary battery) and then while maintaining 0 V, doping was continued at the constant voltage until 5 μA/cm$^2$ was reached. Next, at a constant current of 25 mA/g, undoping was carried out until the potential difference reached 1.5 V (withdrawal of lithium ions from the electrode, corresponding to discharge of a lithium ion battery), and the undoping capacity was measured. The undoping capacity at this time corresponds to the discharge capacity when using this electrode as a negative electrode of a secondary battery, so this was taken as the discharge capacity. The ratio of doping capacity/undoping capacity corresponds to the ratio of discharge capacity/charging capacity of a secondary battery, so this ratio was calculated as an indication of the charge and discharge efficiency.

Measurement of cycling performance was carried out using a coin-shaped nonaqueous test cell having the same structure as described above. This test cell was doped at a constant current of 36 mA/g until the potential difference with respect to the counter electrode became 0 V (corresponding to charging), and then while maintaining 0 V, doping was continued at a constant voltage until 10 μA/cm$^2$ was reached. Next, at a constant current of 36 mA/g, undoping was carried out until the potential difference reached 1.5 V (corresponding to discharge) and the undoping capacity was measured. The undoping capacity at this time was made the discharge capacity.

Doping and undoping were repeated 30 times under the above conditions and the cycling performance were evaluated by the ratio (% capacity retention) of the discharge capacity at the time of the 30th undoping to the discharge capacity at the time of the first undoping. If the cycling performance were at least 90%, the battery could be considered to be good as a practical battery.

TABLE 1

| | Graphite powder | | Pitch | | | Heat | | Carbon material | | | | | | |
|---|---|---|---|---|---|---|---|---|---|---|---|---|---|---|
| Example No. | Avg. particle diam. (μm) | Specific surface area S1 (m$^2$/g) | Softening point (° C.) | Avg. particle diam. (μm) | Content (mass %) | treatment temp. (° C.) | Condition of heat treatment | Avg. particle diam. (μm) | Specific surface area S2 (m$^2$/g) | Ratio S2/S1 | Electrode density (g/cm$^3$) | Discharge capacity (mAh/g) | Charge/discharge efficiency (%) | Cycling performance[1] |
| 1 | 19 | 5.5 | 85 | 50 | 4.5 | 1000 | stationary | 19 | 2.2 | 0.40 | 1.80 | 362 | 93.2 | 91% |
| 2 | 19 | 5.5 | 180 | 50 | 4.5 | 1000 | stationary | 19 | 2.4 | 0.43 | 1.81 | 362 | 92.1 | 90% |
| 3 | 19 | 5.5 | 85 | 150 | 4.5 | 1000 | stationary | 19 | 2.6 | 0.47 | 1.80 | 363 | 92.8 | 91% |
| 4 | 19 | 5.5 | 85 | 100 | 4.5 | 1000 | stationary | 19 | 2.2 | 0.40 | 1.81 | 362 | 93.0 | 91% |
| 5 | 19 | 5.5 | 85 | 75 | 4.5 | 1000 | stationary | 19 | 2.3 | 0.42 | 1.81 | 363 | 93.1 | 91% |
| 6 | 19 | 5.5 | 85 | 50 | 3.0 | 1000 | stationary | 19 | 3.2 | 0.58 | 1.84 | 364 | 94.1 | 94% |
| 7 | 19 | 5.5 | 85 | 50 | 2.0 | 1000 | stationary | 19 | 3.9 | 0.71 | 1.86 | 366 | 93.8 | 93% |
| 8 | 19 | 5.5 | 85 | 50 | 4.5 | 1100 | stationary | 19 | 2.2 | 0.40 | 1.81 | 362 | 93.4 | 92% |
| 9 | 19 | 5.5 | 85 | 50 | 4.5 | 900 | stationary | 19 | 2.4 | 0.44 | 1.81 | 361 | 92.1 | 90% |
| 10 | 10 | 8.0 | 85 | 50 | 4.5 | 1000 | stationary | 10 | 3.3 | 0.41 | 1.75 | 360 | 92.0 | 94% |
| 11 | 30 | 3.0 | 85 | 50 | 4.5 | 1000 | stationary | 30 | 1.2 | 0.40 | 1.85 | 364 | 94.5 | 90% |
| 12 | 19 | 5.5 | 85 | 20 | 4.5 | 1000 | stationary | 19 | 2.2 | 0.40 | 1.81 | 362 | 93.2 | 91% |
| 13 | 13 | 6.3 | 85 | 50 | 2.5 | 1000 | stationary | 13 | 5.0 | 0.79 | 1.75 | 362 | 92.1 | 90% |
| Comp. 1[2] | 19 | 5.5 | 85 | 1000* | 4.5 | 1000 | stationary | 19 | 4.5 | 0.82* | 1.83 | 364 | 90.2 | 84% |
| Comp. 2 | 19 | 5.5 | 85 | 50 | 10* | 1000 | stationary | 19 | 1.3 | 0.24* | 1.68 | 357 | 89.3 | 82% |
| Comp. 3 | 19 | 5.5 | 85 | 50 | 0.5* | 1000 | stationary | 19 | 4.8 | 0.87* | 1.91 | 363 | 89.1 | 68% |
| Comp. 4 | 19 | 5.5 | 85 | 10* | 4.5 | 1000 | stationary | 19 | 4.5 | 0.82* | 1.82 | 362 | 91.0 | 85% |
| Comp. 5 | 19 | 5.5 | 250* | 50 | 4.5 | 1000 | stationary | 19 | 4.5 | 0.82* | 1.82 | 363 | 89.5 | 74% |
| Comp. 6 | 19 | 5.5 | 85 | 50 | 4.5 | 1000 | rotary kiln* | 19 | 4.5 | 0.82* | 1.82 | 361 | 87.8 | 76% |

Notes:
*outside the range of the present invention
[1]Cycling performance = % retention of capacity after 30 cycles
[2]Comp. = Comparative Example As can be seen from Table 1, the carbon materials of Examples 1-13 which were manufactured by the process according to the present invention had a specific surface area and S2/S1 ratio within the prescribed ranges. These carbon materials had a high electrode density, so they exhibited a sufficiently high discharge capacity and had a high charge and discharge efficiency of at least 92%, and their cycling performance was also good as evidenced by the value of % capacity retention after 30 cycles which was at least 90%.

In contrast, with Comparative Example 1 for which the average particle diameter of the pitch powder was too large, the specific surface area and the ratio S2/S1 of the carbon material were too large, and the cycling performance particularly worsened. This is thought to be because the edge planes of the graphite powder were not sufficiently coated, leading to inadequate protection of the edge planes, and decomposition of the electrolytic solution progressed as charging and discharging were repeated.

Comparative Example 4, in which the average particle diameter of the pitch powder was too small, had substantially the same results as did Comparative Example 1, in which the average particle diameter of the pitch was too large. This is because if the pitch powder is too small, the powder agglomerates and forms coarse clumps.

In the case of Comparative Example 2 for which the proportion of pitch powder was too high, the specific surface area and the ratio S2/S1 of the carbon material were too small and graphite powder was coated with too much carbon. As a result, the particle strength became too high, the electrode density markedly decreased, and the discharge capacity decreased. The charge and discharge efficiency and the cycling performance also worsened. This is thought to be because the carbon in the surface coating is partially collapsed by the applied pressure at the time of electrode fabrication.

In Comparative Example 3 for which the proportion of the pitch powder was too low, surface coating of the graphite powder was inadequate, and the specific surface area and the ratio S2/S1 of the carbon material were too large. As a result, the charge and discharge efficiency decreased and the cycling performance greatly worsened.

Similarly in Comparative Example 5 for which the softening point of the pitch powder was too high, the ratio S2/S1 was too large, the charge and discharge efficiency was low, and the cycling performance worsened. This is thought to be because in this comparative example, adequate spreading of molten pitch adhered to the cores did not occur, and the edge planes of graphite particles were not adequately protected by the adhered material.

In Comparative Example 6 in which heat treatment was not carried out in a stationary state, even though the other manufacturing conditions were the same as for Example 1, the specific surface area and the ratio S2/S1 for the carbon material which was manufactured were too large, and the charge and discharge efficiency and cycling performance greatly worsened. This is conjectured to be because carbon could not preferentially adhere to the edge planes of graphite particles, so the edge planes were not adequately protected by coating with the adhered carbon.

The invention claimed is:

1. A carbon material comprising cores of graphite powder having a specific surface area S1 of at most 12.5 $m^2/g$ and carbon adhering to the surface of the cores, wherein the carbon material has a specific surface area S2 of 1.0-5.0 $m^2/g$ with satisfying $0.4 \leq S2/S1 \leq 0.8$, and its average particle diameter is 10-30 μm, and wherein the carbon adhering to the graphite powder cores is formed from pitch powder by heat treatment at a temperature of 900-1100° C., the proportion of the pitch powder before the heat treatment being from 2 to 4.5% based on the total amount of the pitch powder and the graphite powder.

2. A carbon material as set forth in claim 1 wherein the carbon adhering to the graphite powder cores is preferentially adhered to the edge planes of the particles of the graphite powder.

3. A process of manufacturing a carbon material as set forth in claim 1 comprising the steps of:
   mixing graphite powder A having an average particle diameter of 10-30 μm and a specific surface area S1 of at most 12.5 $m^2/g$ with pitch powder B having a softening point of 80-180° C. and an average particle diameter of 15-150 μm in proportions such that the mass ratio A/B is in the range of 98/2-95.5/4.5, and
   subjecting the mixed powder obtained in the above-described step to heat treatment in a stationary state in an inert atmosphere at a temperature of 900-1100° C.

4. A negative electrode for a nonaqueous secondary battery prepared using a carbon material as set forth in claim 1.

5. A nonaqueous secondary battery having a negative electrode as set forth in claim 4 and a nonaqueous electrolytic solution containing substantially no propylene carbonate.

6. A process of manufacturing a carbon material as set forth in claim 2 comprising the steps of:
   mixing graphite powder A having an average particle diameter of 10-30 μm and a specific surface area S1 of at most 12.5 $m^2/g$ with pitch powder B having a softening point of 80-180° C. and an average particle diameter of 15-150 μm in proportions such that the mass ratio A/B is in the range of 98/2-95.5/4.5, and
   subjecting the mixed powder obtained in the above-described step to heat treatment in a stationary state in an inert atmosphere at a temperature of 900-1100° C.

7. A negative electrode for a nonaqueous secondary battery prepared using a carbon material as set forth in claim 2.

* * * * *